Jan. 26, 1943.   J. M. PEARSON ET AL   2,309,415
CONTROL SYSTEM FOR PIPE LINES
Filed June 27, 1940   3 Sheets-Sheet 1

WITNESS:

INVENTOR
John M. Pearson
Birney K. Morse
ATTORNEYS.

Jan. 26, 1943. J. M. PEARSON ET AL 2,309,415
CONTROL SYSTEM FOR PIPE LINES
Filed June 27, 1940 3 Sheets-Sheet 3

WITNESS:

INVENTORS
John M. Pearson
Birney K. Morse
BY
ATTORNEYS.

Patented Jan. 26, 1943

2,309,415

UNITED STATES PATENT OFFICE 2,309,415

CONTROL SYSTEM FOR PIPE LINES

John M. Pearson and Birney K. Morse, Swarthmore, Pa., assignors to Sun Oil Company, Philadelphia, Pa., a corporation of New Jersey Application June 27, 1940, Serial No. 342,632

18 Claims. (Cl. 137—78)

This invention relates to a control system for pipe lines or similar fluid pressure or hydraulic systems, and more specifically to automatic control systems for pipe line booster stations.

In the patent to Henry Thomas, No. 2,049,233, dated July 28, 1936, there is described a control system for pipe lines designed to maintain a substantially constant delivery pressure of liquid from a booster pump through the operation of controls responsive to the pressure at the intake of the pump. As disclosed in said patent, the arrangement is such that a control valve on the inlet side of the pump throttles the flow to the inlet of the pump if pressure at the inlet increase above a predetermined maximum, while a valve on the outlet side of the pump throttles the output of the pump if the pressure at the inlet of the pump decreases below a predetermined minimum.

With a constant operation of the pump and with the handling of a particular fluid, the maintenance of the inlet pressure between predetermined limits by the arrangement of the patent insures operation of the pump under conditions of positive suction pressure so that the stuffing boxes are protected from excessive pressure and insurance is also provided that the pump will not run dry. Operating in this manner, the pump station will pump as much fluid as it can get rid of, or as much fluid as it receives, whichever quantity is smaller.

When the controls described in said Thomas patent are provided, the operation of the pipe line will depend on the location of the pump station in the line, the friction in the line, and the amount of fluid being pumped. This latter may vary greatly, for instance, if there are bulk plants which take deliveries in between the pump stations. Ordinarily the pipe line is designed to deliver the required rate to the principal terminals, with due account taken of the smaller rates required at intermediate points. Under these conditions, for example, if a single fluid such as gasoline only is being pumped, the pump design will be such that it will provide sufficient pressure at the outlet side of each station to supply the next station with a positive suction pressure at the maximum rate of flow. The outlet pressure is limited by the strength of the pipe line so that it is necessary to adjust the spacing of the pump stations with this in view.

If fluids of different densities are to be pumped, other matters must be taken into account. These arise from several fundamental matters, which are as follows:

For a given pump speed (the pumps generally are desirably operated at a fixed speed), the head produced, measured in feet, is substantially the same for different density liquids. This being the case, the pressure at the pump outlet is proportional to the density.

With turbulent flow, which is that normally existing in the pipe line, the pressure gradient due to friction is proportional to the density. The head gradient, however, is independent of the density. The friction loss is, of course, also related directly to the rate of flow.

From the above it follows that if a change is made in the liquids being pumped from a liquid of one density to that of another, the quantity flowing remains the same, and the heads remain the same, but the pressures in the system increase in proportion to the density. This increase of pressure may reach quite dangerous proportions in the pumping of, for example, various petroleum liquids, since the system will generally be designed to provide a maximum rate of flow with safety in the case of the lighter liquids of the group to be pumped. Accordingly, the present invention has as its object the improvement of the control system described in said Thomas patent by the addition of controlling devices for insuring safe but proper and efficient operation of the system when handling liquids of different densities.

The conditions existing in a pipe line may be represented graphically by plotting against the length of the line its elevation profile. At a point of this profile at which a pump is located, a perpendicular may be erected having a height above the profile corresponding to the delivery head of the pump. From the top of this perpendicular a line may then be drawn having a downward slope corresponding to the friction head loss per unit length of the line for a given rate of flow. In such a graphical representation, the head at any point of the line for this given rate of flow and delivery head of the pump is given by the height of the sloping line above the profile at the point in question. If this line clears the profile up to the location of the next pump, the arrangement will be operative to provide a delivery under the assumed conditions to the next pump at a positive suction pressure.

Starting from such graphical representation, the nature of the control required will be apparent. If a denser liquid is to be pumped, and the volumetric quantity of the liquid pumped remains the same, the graphical representation will remain the same in terms of heads of liquid, but if these heads are translated into pressures, the pressures are now increased throughout the system in the ratio of the density of the new liquid being pumped to that of the prior liquid being pumped.

If the pressure in the line where it receives the liquid from the pump is that to be considered from the standpoint of safety, throttling at the pump outlet will produce a drop in pressure such that, translating conditions into terms of head, the top of the aforementioned perpendicular will be lowered. The result of the throttling, however, is also to cut down the rate of flow, other conditions being constant, and consequently the friction head loss, and consequently the gradient line drawn from the top of this perpendicular will have less slope. The slope of this gradient is not solely dependent upon the throttling just mentioned, but upon demand conditions as well. However, if, as has just been assumed, the pressure in the line where it receives liquid from the pump sets the limit of operation, an automatic throttle control of the flow from the pump will be satisfactory for control provided under all conditions of operation which are contemplated, the gradient line lies above the profile up to the location of the next pumping station.

It is, however, not always the case that the pressure at the delivery of the pump is the factor to be considered. For example, assume that a deep valley occurs in the profile subsequent to the pump under consideration. In such case, bringing down by throttling the pressure at which the liquid of higher density is delivered to the line may be accompanied, due to the throttling or other conditions, by a decrease in the slope of the gradient line to such extent that despite the reduction of pressure at the pump, the gradient line may be so high above the valley in the profile that, translated into terms of pressure, the pressure on the pipe at this point may exceed safe limits. Consequently, if this gradient was to be maintained due to a particular rate of flow, further throttling of the delivery of the pump would have to occur to bring the pressure down to a safe value at the critical location. On the other hand, if demand conditions were such that a greater flow rate was provided, the gradient line would have a steeper slope and the pressure permissible at the pump could be higher.

In accordance with the present invention, provision is made, therefore, not only to maintain within a safe limit the pressure at the point of delivery from the pump to a pipe line to take care of varying densities of liquid, but provision is also made to insure safe conditions elsewhere in the pipe line such, for example, as that described involving a depression of the level of the line. The automatic control is designed, in accordance with the invention, to provide maximum efficiency consistent with safety.

This and other objects of the invention will be apparent from the following description, read in conjunction with the accompanying drawings, in which.

Figure 3:
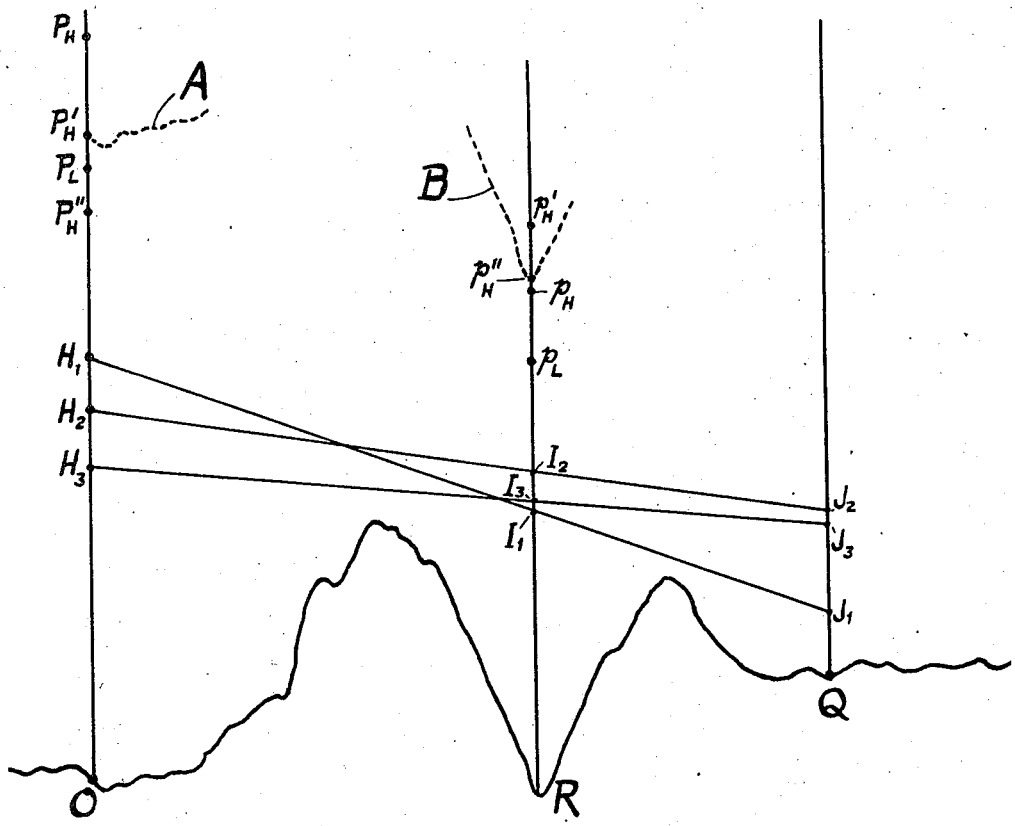
Figure 3 is a diagram illustrating the action of the apparatus provided in accordance with the invention.

Referring first to Figure 3, the controlling problems involved may be understood by consideration of a particular condition illustrated therein. At the bottom of this figure there is indicated a profile of the terrain on which a pipe line lies between two pumping stations at O and Q, between which there occurs at R a deep valley, for example a river bed between high banks. Let it be assumed that the pumping station at O is required to deliver petroleum products of different densities to the pumping station at Q, from which the products will be relayed over a further portion of the pipe line.

Let the permissible pressure in pounds per square inch in the pipe line in the vicinity of O have a certain value, which may be represented by the height of a duplicate A of the profile located above the lower profile. For convenience let it be assumed that pressures are measured not above a horizontal datum line, but above the profile. Scales of both pressure in pounds per square inch and heads in feet are superimposed on this diagram, but they do not conflict, the letters "P" referring to pressure values and the other letters referring to head values measured above a horizontal datum line, for example, sea level.

Assume, similarly, that at the location of the valley R the permissible pressure values are represented by the line B. Assuming first a satisfactory condition of operation for a low density liquid, and assuming that the pump is operating with its outlet open, the head produced at the pumping station O may be represented by the line $OH_1$. Assuming that the line is of uniform diameter and that no extraction of the liquid takes place between the two pumping stations with which we are concerned, the head gradient may be represented as a straight line running through the point $I_1$ above the valley R and a point $J_1$ above the second pumping station Q. If this line clears the peaks of the profile between the stations, it will mean that the system will be operative. If, now, the head $OH_1$ is multiplied by the necessary factor for the low density liquid, we may find the pressure at O has some value $P_L$, lying below the limiting pressure A and consequently permissible. Likewise, the pressure at R obtained in similar fashion and indicated at $p_L$ is below the permissible pressure B, and, therefore, satisfactory and safe operation with the low density liquid is possible with the outlet of the pump open to the extent corresponding to the attainment of these conditions.

Suppose, now, under the same conditions a higher density liquid is being pumped. In such case, the diagram of the heads remains the same, but the factor by which the head must be multiplied to give the pressure in pounds per square inch is now greater, and let is assume it is such that we now find above O a pressure $P_H$ and above R a pressure $p_H$. Conditions are now still safe at R, but unsafe at O, where the pressure has risen above that which is permissible.

If, now, the outlet of the pump is throttled so as to cut down the pressure to $P_H'$ falling on the safe line A, the corresponding head at O obtained by dividing by the proper density factor may now be $OH_2$. By reason of the throttling, however, the rate of flow will have been cut down, with the result that the gradient of the head due to friction losses becomes less steep, becoming, for example, the line $H_2I_2J_2$. Conditions at O are now satisfactory, but it will be noted that the head above R has been increased rather than decreased, the considerable reduction in friction losses making up for the lower pressure at the pumping station, so that the head at R is now $I_2$. If we multiply this head by the proper density factor, we find at R a pressure $p_H'$, which is now above the line B and not permissible, so that this condition of operation is not allowable. To secure safe conditions, therefore, it is necessary that further throttling occurs to bring the pressure at R down to the safe value on the line B, namely, to a pressure represented at $p_H''$. The head corresponding to this pressure will be $I_3$. Since further throttling will reduce the flow still more, and with it the friction losses, the gradient now obtained will be of still less slope, as indicated at $H_3I_3J_3$. The new pressure at the pumping station O will accordingly have some value $P_H''$. Thus under these final conditions, the pressures of delivery may all well be within safe limitations for a location of the second pumping station as indicated. The achievement of these results will now be described.

The two pipe line sections between which the booster pump is located are indicated at 2 and 4 and are connected through a check valve 6, through which flow may bypass the booster pump. Liquid is supplied to the booster pump 14 through a connection 8 containing a shut-off valve 10 and a diaphragm controlled valve 12. The booster pump 14 is driven by a motor 16, which is normally continuously operating at a constant speed. The pump 14 delivers the liquid to the line 4 through the connection 18, in which are interposed the diaphragm controlled valve 20, the stop valve 22 and a check valve 24. A pipe 26 joins the inlet line 8 to the controller 28, supplied with air from a pressure source indicated at 30 to control, through the air connection 32, the valve 20. Air pressure in the line 32 normally maintains the valve 20 open, the valve moving toward closed position upon reduction of pressure. In this line is inserted the controller 34, which is connected to the diaphragm controlled valve 20 by the connection 35. A connection 36 joins the controller to the pipe below valve 20, as will be described hereafter. Except for the interposition of the controller 34, the controller 28 and its connections are the same as described in said Thomas patent for effecting control of valve 20 in the outlet from the pump.

A pipe 38 connects the inlet line 8 with the controller 40, which, through air from the pressure source 30, controls, through the line 42, the diaphragm controlled valve 12. This controller corresponds to the similar controller for the valve in the inlet line descibed in said Thomas patent.

For safety purposes, provision is made for shutting down the motor 16 in the event that the inlet pressure is too low to be subject to proper control, or the outlet pressure becomes too high for proper control. For this purpose, a battery 44 is provided in series with a solenoid switch 50 to open the switch under the action of either a low pressure controlled switch 48 or a high pressure controlled switch 46 to break the connection of the motor 16 to the power supply line 52.

To the extent so far described, if it is assumed that the additional controller 34 is inactive, the control of the system is identical with that described in the Thomas patent. If the pressure in the line 8 rises above a predetermined maximum, the controller 40 serves to close partially the valve 12 to such extent as to throttle the inflowing liquid and bring the inlet pressure to normal. On the other hand, if the pressure in the line 8 drops below a predetermined minimum, the controller 28 causes the valve 20 to move toward closed position to throttle the output of the pump 14, reducing the throughput and thus restoring the proper pressure at the intake.

The present invention provides the auxiliary controller 34, which will now be described in detail with particular reference to Figure 2.

Figure 2:
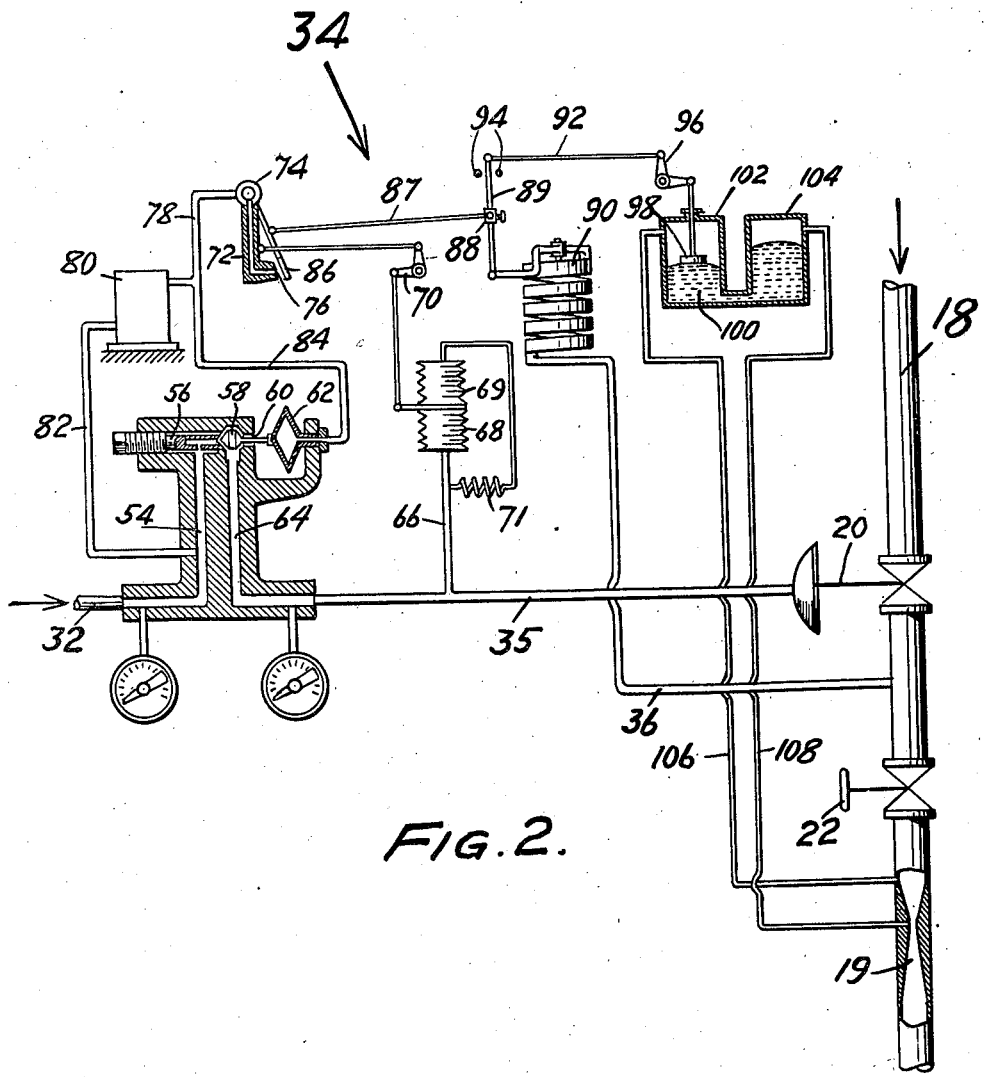
Figure 2 is a diagrammatic representation of the control apparatus added to that of the Thomas patent.

The air line 32 extending from the controller 28 communicates with a bore 54 in a suitable casing and with the interior of an adjustable member 56 providing a left hand seat for a valve member 58, also adapted to seat toward its right hand side, as viewed in Figure 2, to close a bleed opening 60 open to the atmosphere. The valve 58 is controlled by movements of an air pressure responsive member 62. The chamber in which the valve 58 moves communicates through bore 64 and connection 35 with the diaphragm chamber of the valve 20. When the pressure in 35 increases, the valve 20 moves toward open position. When the pressure decreases, the valve moves toward closed position. From the line 35 there extends a connection 66 communicating with the lower of a pair of expansible chambers 68 and 69, the outer ends of which are fixed, while their adjacent ends are connected to each other and through a link mechanism 70 to a bored member 72 provided with a valve seat 76. This member 72 is pivoted at 74 and its bore receives air under pressure through a connection 78 and a metering valve 80 receiving air from bore 54 through connection 82. The reduced pressure air line 78 communicates with the expansible chamber 62 through the line 84. The two chambers 68 and 69 are connected through a capillary coiled tube 71, which provides substantial resistance to the flow of air, thereby to effect relatively slow passage of air from one chamber to the other. The result will be that if the pressure in line 66 increases a differential pressure between the chambers will first exist, so that 68 will expand and 69 will be compressed. However, if the pressure in line 66 is maintained, leakage of air from 68 into 69 will take place, bringing the chambers slowly back to their initial position. Similarly, a decrease in pressure in 66 will produce an opposite movement, but again leakage between the chambers will bring them slowly back to normal position.

A flap member 86 serves as a valve to close more or less the bore in the member 72 by seating on 76. This flap is connected by a link 87 to an adjustable slide 88 mounted on a rod 89 which, at its lower end, is connected to a pressure responsive coiled tube 90 joined by the connection 36 to the portion of the pipe 18 on the delivery side of the valve 20. The coil is so arranged that, when the pressure therein increases, the flap 86 will be moved toward its seated position if the upper end of the rod 89 remains in fixed position.

The upper end of the rod 89 is connected by means of a link 92 to a bell crank 96, link connected to a float 98 in a chamber 102, communicating with a chamber 104 through a connecting tube at the bottoms of the chambers. Mercury 100 within these chambers supports the float 98. These chambers are connected by tubes 106 and 108, respectively, to the inlet mouth and the throat of a venturi 19, located in the pipe 18, below the valve 20. The arrangement is such that as flow through the venturi increases the difference in level of the mercury in the chambers 102 and 104 is increased and consequently the rod 89 has its upper end moved to the right, so that, if its lower end is assumed fixed, the flap 86 would be moved away from the seat 76. It will be evident from this arrangement of the connections to rod 89 that both the pressure in the pipe 18 and the flow therethrough coact to control the flap 86. The arrangement may best be viewed by considering that the pressure assumes the major part in the control and that the flow is effective to shift the operating range of the pressure control. Stops 94 are desirably provided as indicated to limit the movements of the upper end of the rod 89 so as to limit the shift of the range of control by the pressure responsive device 90. The relative effects of pressure and flow may be adjusted by locating the slide 88 at various positions along the rod 89.

Figure 1:
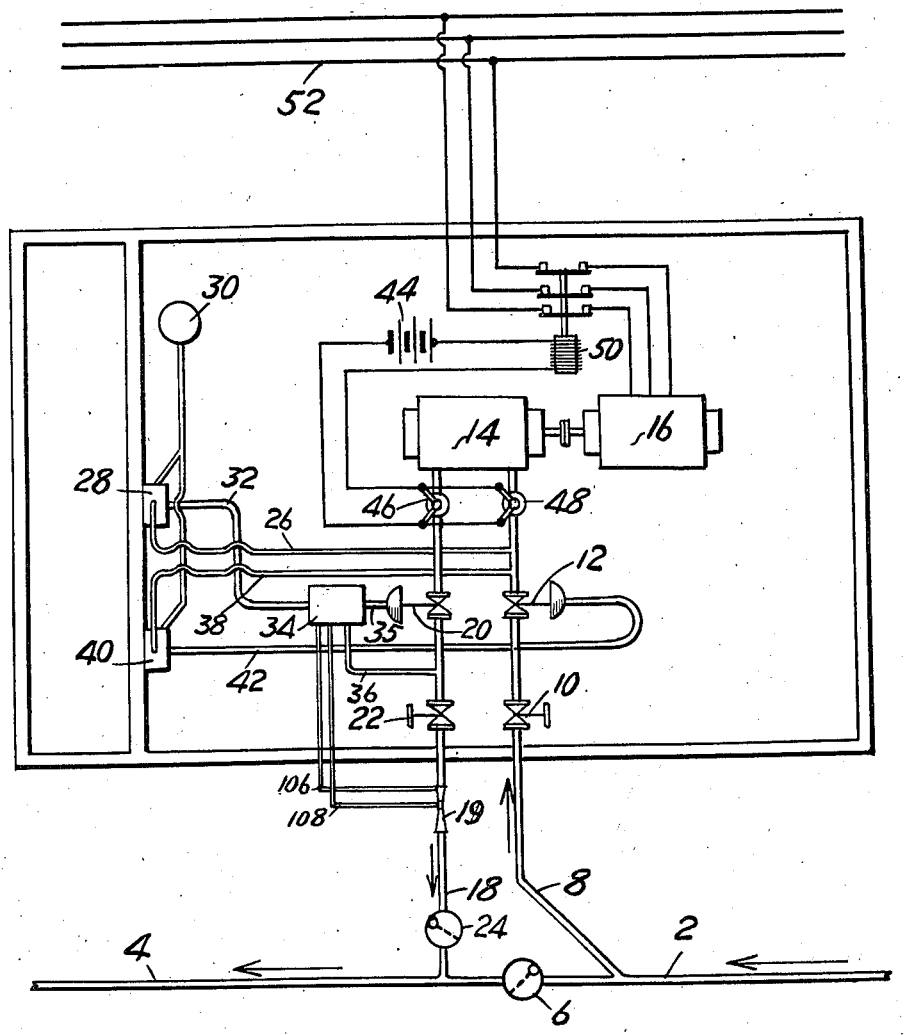
Figure 1 is a diagrammatic representation of the system.

Assuming first that a liquid of low density is being handled by the system, and at some normal rate of flow, the pressure in the coil 90 due to the connection 36 will be below that effecting operation of the controller 34, and air will continuously bleed through the bore of the member 72, so that the valve 58 will be located in its right hand position closing the escape outlet 60. As a consequence, air pressure is maintained on the diaphragm controlled valve 20, which will remain under control of controller 28, Figure 1, working through the air passages of controller 34.

Assume now that while the rate of flow remains the same, a heavier liquid reaches the pump and that conditions on the inlet side of the pump are normal so that the controllers 28 and 40 would establish normal conditions of the system, i. e., so that, so far as these controllers are concerned, the valves 20 and 12 may remain open. The pressure at the outlet of the pump may now rise quite considerably, in proportion to the increased density of the liquid being handled, and consequently the control 34 may come into action. As the pressure increases, the coil 90 will effect movement of the flap 86 to close the bore in the member 72. As a result, the valve 58 will move toward the left to cut off the supply of air through the adjustable member 56 and to vent the connection 35 to the atmosphere through the opening 60. As a result, the valve 20 will move toward its closed position throttling the output of the pump 14 and thereby cutting down the pressure in the line 4. If this happens to result in an increased pressure on the inlet side, the valve 12 may partially close as described in said Thomas patent. The pressure conditions through the system will then result in automatic control of all of the booster pumps to effect a stable and proper condition of operation.

In the attainment of the equilibrium condition, the chambers 68 and 69 effect a movement of the member 72 away from the flap valve 86 with the restoration of the member 72 to normal position as equilibrium is obtained. Smooth operation without hunting is thus provided to cause the valve 20 to move gradually toward its closed position.

In the above described operation, it was assumed that the flow remains constant. The same operation would, of course, result if the slide 88 was at the lower end of the rod 89, so that control was effectively taken away from the venturi 19 and the elements connected thereto. If it is assumed that the slide 88 has any such position as to give some effective control by the rate of flow, and it is assumed that the rate of flow was decreased by the throttling action or some other conditions in the system, it will be evident that the effect of the decreased rate of flow will be to cause the flap 86 to move toward the seat 76 with the effect of causing the coil 90 to control the movement of valve 20 toward closed position at a lower pressure than would otherwise cause such movement. In other words, a reduction of the rate of flow, if that accompanies an increase in density of the liquid being pumped, will cause additional throttling of the output of the pump to drop the pressure still further. On the other hand, an increase in rate of flow will tend to produce less throttling than would be effected by the control 90 acting alone.

It will be evident from the above that the control may be made dependent upon conditions in a particular portion of the pipe line remote from the pump merely by suitably adjusting the position of the slide 88, which would be moved further toward the top of the slide as the location to be considered was remote from the pump so that the effects of flow upon desired conditions would become more and more important. The stops 94 insure that the flow responsive means will not take control away from the point of discharge of the pump to such extent as possibly to give rise to dangerous pressures thereat. While reference has been made particularly to such control as might be necessitated by a particularly low location of a part of the line, it will be evident that the control arrangement may be made to take care of conditions due to other causes or configurations of the system.

It will be seen that despite the presence of the controller 34, the valve 20 is under control of the controller 28 just the same as in the arrangement of the Thomas patent, since, if the controller 28 causes a reduction of pressure in the line 32, this will result in reduction of pressure on the diaphragm valve 20 just as much as that occasioned by the movement of the valve member 58 to the left. With the two controllers 28 and 34 in series, therefore, the action of either may result in movement of the valve 20 toward closed position.

What we claim and desire to protect by Letters Patent is:

1. In a pipe-line system for the transportation of liquid between geographically remote points, the combination of a long pipe-line, a pump in said pipe-line, said pump being of a type having the quantity of liquid it delivers reducible by throttling, a valve controlling delivery from the pump to the pipe-line, means operable by decrease in pressure below a predetermined normal value at the inlet side of the pump to move said delivery controlling valve towards its closed position, and means operable by increase in pressure above a predetermined normal value at the outlet side of said pump to move said delivery controlling valve towards its closed position.

2. In a pipe-line system for the transportation of liquid between geographically remote points, the combination of a long pipe-line, a pump in said pipe-line, said pump being of a type having the quantity of liquid it delivers reducible by throttling, a valve controlling delivery from the pump to the pipe-line, and means for moving said delivery controlling valve towards its closed position operable both by decrease in pressure below a predetermined normal value at the inlet side of the pump and by increase in pressure above a predetermined normal value at the outlet side of the pump.

3. In a pipe-line system for the transportation of liquid between geographically remote points, the combination of a long pipe-line, a pump in said pipe-line, said pump being of a type having the quantity of liquid it delivers reducible by throttling, a valve controlling the inflow to the pump from the pipe-line, means operable by increase in pressure above a predetermined normal value at the inlet side of the pump to move said inflow controlling valve towards its closed position, a valve controlling delivery from the pump to the pipe-line, means operable by decrease in pressure below a predetermined normal value at the inlet side of the pump to move said delivery controlling valve towards its closed position, and means operable by increase in pressure above a predetermined normal value at the outlet side of said pump to move said delivery controlling valve towards its closed position.

4. In a pipe-line system for the transportation of liquid between geographically remote points, the combination of a long pipe-line, a pump in said pipe-line, said pump being of a type having the quantity of liquid it delivers reducible by throttling, a valve controlling the inflow to the pump from the pipe-line, means operable by increase in pressure above a predetermined normal value at the inlet side of the pump to move said inflow controlling valve towards its closed position, a valve controlling delivery from the pump to the pipe-line, and means for moving said delivery controlling valve towards its closed positon operable both by decrease in pressure below a predetermined normal value at the inlet side of the pump and by increase in pressure above a predetermined normal value at the outlet side of the pump.

5. In a pipe-line system for the transportation of liquid between geographically remote points, the combination of a long pipe-line, a pump in said pipe-line, said pump being of a type having the quantity of liquid it delivers reducible by throttling, a valve controlling delivery from the pump to the pipe-line, means operable by decrease in pressure below a predetermined normal value at the inlet side of the pump to move said delivery controlling valve towards its closed position, and means operable by increase in flow above a predetermined normal rate from the pump to move said delivery controlling valve towards its open position.

6. In a pipe-line system for the transportation of liquid between geographically remote points, the combination of a long pipe-line, a pump in said pipe-line, said pump being of a type having the quantity of liquid it delivers reducible by throttling, a valve controlling delivery from the pump to the pipe-line, means operable by decrease in pressure below a predetermined normal value at the inlet side of the pump to move said delivery controlling valve towards its closed position, means operable by increase in pressure above a predetermined normal value at the outlet side of said pump to move said delivery controlling valve towards its closed position, and means operable by increase in flow above a predetermined normal rate from the pump to move said delivery controlling valve towards its open position.

7. In a pipe-line system for the transportation of liquid between geographically remote points, the combination of a long pipe-line, a pump in said pipe-line, said pump being of a type having the quantity of liquid it delivers reducible by throttling, a valve throttling and thereby controlling delivery from the pump to the pipe-line, and means operable by increase in flow above a predetermined normal rate from the pump to move said delivery controlling valve towards its open position.

8. In a pipe-line system for the transportation of liquid between geographically remote points, the combination of a long pipe-line, a pump in said pipe-line, said pump being of a type having the quantity of liquid it delivers reducible by throttling, a valve controlling delivery from the pump to the pipe-line, means operable by increase in pressure above a predetermined normal value at the outlet side of said pump to move said delivery controlling valve towards its closed position, and means operable by increase in flow above a predetermined normal rate from the pump to move said delivery controlling valve towards its open position.

9. In a pipe-line system for the transportation of liquids between geographically remote points, the combination of a long pipe-line, a pump in said pipe-line, said pump being of a type having the quantity of liquid it delivers reducible by throttling, a valve controlling delivery from the pump to the pipe-line, means for moving said delivery controlling valve towards its closed position operable by increase in pressure above a predetermined normal value at the outlet side of the pump, and means responsive to flow of liquid from the pump for controlling the operation of the last named means to effect movement of said valve towards its open position when the rate of flow increases above predetermined normal.

10. In a pipe-line system for the transportation of liquid between geographically remote points, the combination of a long pipe-line, a pump in said pipe-line, said pump being of a type having the quantity of liquid it delivers reducible by throttling, means operable by decrease in pressure below a predetermined normal value at the inlet side of the pump to restrict the delivery of liquid from the pump to the pipe-line, and means operable by increase in pressure above a predetermined normal value at the outlet side of the pump to restrict the delivery of liquid from the pump to the pipe-line.

11. In a pipe-line system for the transportation of liquid between geographically remote points, the combination of a long pipe-line, a pump in said pipe-line, said pump being of a type having the quantity of liquid it delivers reducible by throttling, means operable by decrease in pressure below a predetermined normal value at the inlet side of the pump to restrict the delivery of liquid from the pump to the pipe-line, and means operable by decrease in flow below a predetermined normal rate from the pump to restrict the delivery of liquid from the pump to the pipe-line.

12. In a pipe-line system for the transportation of liquid between geographically remote points, the combination of a long pipe-line, a pump in said pipe-line, said pump being of a type having the quantity of liquid it delivers reducible by throttling, means operable by decrease in pressure below a predetermined normal value at the inlet side of the pump to restrict the delivery of liquid from the pump to the pipe-line, means operable by increase in pressure above a predetermined normal value at the outlet side of the pump to restrict the delivery of liquid from the pump to the pipe-line, and means operable by decrease in flow below a predetermined normal rate from the pump to restrict the delivery of liquid from the pump to the pipe-line.

13. In a pipe-line system for the transportation of liquid between geographically remote points, the combination of a long pipe-line, a pump in said pipe-line, said pump being of a type having the quantity of liquid it delivers reducible by throttling, and means operable by decrease in flow below a predetermined normal rate from the pump to restrict the delivery of liquid from the pump to the pipe-line.

14. In a pipe-line system for the transportation of liquid between geographically remote points, the combination of a long pipe-line, a pump in said pipe-line, said pump being of a type having the quantity of liquid it delivers reducible by throttling, means operable by increase in pressure above a predetermined normal value at the outlet side of the pump to resist the delivery of liquid from the pump to the pipe-line, and means operable by decrease in flow below a predetermined normal rate from the pump to restrict the delivery of liquid from the pump to the pipe-line.

15. In a pipe-line system for the transportation of liquid between geographically remote points, the combination of a long pipe-line, a pump in said pipe-line, means operable by decrease in pressure below a predetermined normal value at the inlet side of the pump to reduce the delivery of liquid from the pump to the pipe-line, means operable by increase in pressure above a predetermined normal value at the outlet side of the pump to reduce the delivery of liquid from the pump to the pipe-line, and means operable by decrease in flow below a predetermined normal rate from the pump to reduce the delivery of liquid from the pump to the pipe-line.

16. In a pipe-line system for the transportation of liquid between geographically remote points, the combination of a long pipe-line, a pump in said pipe-line, means operable by increase in pressure above a predetermined normal value at the outlet side of the pump to reduce the delivery of liquid from the pump to the pipe-line, and means operable by decrease in flow below a predetermined normal rate from the pump to reduce the delivery of liquid from the pump to the pipe-line.

17. In a pipe-line system for the transportation of liquid between geographically remote points, the combination of a long pipe-line, a pump in said pipe-line, means operable by decrease in pressure below a predetermined normal value at the inlet side of the pump to reduce the delivery of liquid from the pump to the pipe-line, and means operable by increase in pressure above a predetermined normal value at the outlet side of the pump to reduce the delivery of liquid from the pump to the pipe-line.

18. In a pipe-line system for the transportation of liquid between geographically remote points, the combination of a long pipe-line, a pump in said pipe-line, said pump being of a type having the quantity of liquid it delivers reducible by throttling, a valve controlling the inflow to the pump from the pipe-line, means operable by increase in pressure above a predetermined normal value at the inlet side of the pump to move said inflow controlling valve towards its closed position, means operable by decrease in pressure below a predetermined normal value at the inlet side of the pump to restrict the delivery of liquid from the pump to the pipe-line, and means operable by increase in pressure above a predetermined normal value at the outlet side of the pump to restrict the delivery of liquid from the pump to the pipe-line.

JOHN M. PEARSON.
BIRNEY K. MORSE.